United States Patent [19]
Mallary

[11] Patent Number: 5,229,901
[45] Date of Patent: Jul. 20, 1993

[54] SIDE-BY-SIDE READ/WRITE HEADS WITH ROTARY POSITIONER

[75] Inventor: Michael L. Mallary, Berlin, Mass.

[73] Assignee: Digital Equipment Corporation, Maynard, Mass.

[21] Appl. No.: 723,087

[22] Filed: Jun. 28, 1991

[51] Int. Cl.[5] .................. G11B 5/55; G11B 5/596; G11B 5/29

[52] U.S. Cl. .................. 360/104; 360/77.02; 369/272

[58] Field of Search ........... 360/77.02, 77.05, 77.07, 360/77.08, 135, 86, 55, 103, 104, 106; 369/277, 278, 279, 222, 250, 272, 275.1, 275.3, 44.17, 44.18

[56] References Cited

U.S. PATENT DOCUMENTS

| | | | |
|---|---|---|---|
| 4,414,589 | 11/1983 | Oliver et al. | 360/77 |
| 4,499,574 | 2/1985 | Braat | 369/275 |
| 4,620,251 | 10/1986 | Gitzendanner | 360/105 |
| 4,945,427 | 7/1990 | Cunningham | 360/103 |
| 4,953,051 | 8/1990 | Wada et al. | 360/104 |
| 5,010,430 | 4/1991 | Yamada et al. | 360/103 |

OTHER PUBLICATIONS

Chang et al., *IEEE Trans. on Magnetics*, vol. MAG-23, No. 5, Sep. 1987, pp. 2934-2936.
Yamada et al., *IEEE Trans. on Magnetics*, vol. MAG-22, No. 5, Sep. 1986, pp. 698-700.
Chen et al., *IEEE Trans. on Magnetics*, vol. MAG-17, No. 6, Nov. 1981, pp. 2905-2907.

Primary Examiner—Stuart S. Levy
Assistant Examiner—Paul J. Ditmyer
Attorney, Agent, or Firm—Cesari and McKenna

[57] ABSTRACT

A disk drive (10) includes a head positioner (16) on which are mounted separate read and write heads (52 and 54) that are spaced apart in the direction radial of the disk axis. Headers (50) on a disk (12) in the disk drive (10) establish track pitches that vary with radial position in such a manner that the radial separation of the read and write heads (52, 54) is equal to an integral number of track spacings that is substantially independent of the positioner angle.

17 Claims, 3 Drawing Sheets

SIDE-BY-SIDE READ/WRITE HEADS WITH ROTARY POSITIONER

BACKGROUND OF THE INVENTION

The present invention is directed to disk drives for data processing equipment and in particular to drives that use rotary head positioners.

Disk drives include disks of magnetic material that are rotated rapidly about their axes and have data magnetically written on the magnetic material in concentric circular tracks. Access to the data is provided by read and write heads, which are positioned above the surfaces of the disks by positioning arms. To read data on a single track, a positioner holds the heads in a relatively stationary position as the disk spins beneath it, but the positioner must move the heads to a different radial position with respect to the disk axis if data are to be read or written on a different track.

Disk drives usually use either linear or rotary positioners. A linear positioner moves the heads in a straight line along a disk radius, while rotary positioners pivot about an axis and thus cause the heads to execute arcuate motion that, while being predominantly radial, additionally has a circumferential component. Although commercial products employing both types of positioners are currently available, disk drives that employ rotary positioners enjoy a size and cost advantage. Continued pressure for higher-capacity, lower-cost drives therefore provides a considerable incentive to employ rotary positioners.

Unfortunately, although most currently available drives use common inductive heads for both reading and writing, the need for increased capacity also provides an incentive to employ separate read and write heads, and the use of separate read and write heads presents obstacles to the use of rotary positioners in conventional disk drives. The incentive for separate heads results from a need for increased signal-to-noise ratio. Increases in disk data density are almost inevitably accompanied by reductions in the amount of magnetic material that contributes to the magnetic-field intensity at each data-carrying magnetic transition. Such reductions decrease the strength of the signal that a transition can cause in a read head, but design compromises dictated by the use of the same head for both reading and writing limit the designer's ability to respond to the signal-strength decrease by optimizing the head's reading performance. To obtain the last bit of performance increase in an inductive head, therefore, separation of read and write functions is necessary.

The potential of magnetoresistive heads provides further incentive for head separation. One way that has been proposed to increase read-head performance is to dispense with the widely used inductive read head and employ what is known as a magnetoresistive head. A magnetoresistive head drives current through a film of material, such as NiFe, whose resistivity is a function of the angle between the current density and the magnetic-field intensity. By observing the voltage variations that result from the flow of a known current through a head made of such material, one can observe the magnetic transitions in a desk spinning beneath the head and thus read the data that they encode.

A well-designed magnetoresistive head has the potential for a signal-to-noise ratio significantly higher than that of a comparable inductive head. But such performance can be achieved only if the read head is spaced far enough from its companion write head to prevent the write-head field from causing changes in the magnetoresistive head's magnetization state. Otherwise, the write head could cause the magnetoresistive film to lose the single-domain magnetic state that it is intended to have, and this would subject its output to Barkhausen noise caused by motion of domain boundaries in the film.

But separating the read and write heads causes difficulties that arise from the need to use a read head in conjunction with a write operation. Each circular track on a formatted disk has a plurality of circumferentially spaced data-containing sectors separated by headers, which contain various types of housekeeping information, such as the identity of the track on which the header is found and of the sector that follows the header. Headers typically also include timing bursts, which serve as references for the drive's sampling clock, and they may additionally include fields that have, e.g., bad-block-replacement information and sectored servo information, the latter of which the disk drive uses to locate the centerline of a track.

In order to write in the appropriate place, the drive must first read the header information so that it can ascertain the current write-head location. If the read and write heads are the same, or at least occupy essentially the same space, this presents no problem. However, if the track pitch is very low—i.e., if the number of tracks per unit radial distance is high—then any significant separation between the read head and the write head makes it difficult to use information obtained from the read head to position the write head properly.

This is partly a fabrication problem. An inductive read/write head has roughly the form of a horseshoe magnet. The open end of the horseshoe faces the disk surface with the legs aligned along the track, one leg ahead of the other, so that as the disk spins, each magnetic transition encountered by the head will at some point be located between the legs. In modern disk drives, the head is fabricated in a photolithographic process substantially the same as that employed to make conventional integrated circuits, with one leg of the horseshoe being laid down in one fabrication layer while a spacer and the other leg are laid down in subsequent fabrication layers. The disk-facing surface is provided by slicing through the substrate to reveal a cross section in which moving up in the thickness direction through the substrate means moving circumferentially along the disk track. If a second head is to be spaced farther along the track, therefore, it must be deposited in higher lithographic layers, whose contents are determined in separate masking steps at different substrate depths. Proper alignment of the heads thus becomes a problem of mask alignment. The smaller the track pitch, the more severe the alignment requirement is.

These process considerations apply regardless of the type of head positioner used. But certain other problems, which remain even if these process problems are overcome, are peculiar to the rotary positioner. In moving from track to track, a rotary positioner not only translates the heads but also changes their angular positions. Thus, displacement between heads that has only a desired circumferential component at one positioner angle acquires an undesired radial component when the positioner is oriented at another angle; i.e., if the read and write heads are both exactly on the track centerline at one positioner angle, the centering one of the heads at another positioner angle will cause the other head to be offset. Such an offset can be significant, and even intolerable, if the track pitch is low and the displacement between the heads is great enough to allow proper magnetoresistive-head operation.

One proposal for dealing with this problem is simply to take advantage of the width of the track and orient the positioner so that the heads are offset slightly in opposite directions from the track centerline. But there is clearly a limit to the applicability of this approach; at a certain track pitch, the offset range will exceed the width of the track.

Another approach is to position the read head on the basis of information contained in a header disposed several sectors ahead of the target write location; this gives the positioner control system time to move the positioner radially by the (known) radial offset between the heads. But if the disk drive relies on sectored servo information to center the heads properly, this approach "lengthens" the servo loop, thus making tracking more difficult. And even if only track/sector ID information from the header is important, this approach still extends the latency time and increases the time interval during which the clock must stay in synchronization between timing bursts.

For all these reasons, the trend toward greater data density makes it difficult to retain the advantages of rotary positioners.

SUMMARY OF THE INVENTION

My invention greatly reduces the alignment difficulties presented by the use of rotary positioners in high-density disks. According to my invention, the heads are placed "side by side," i.e., are radially displaced, so that they are located over different tracks. Side-by-side placement has been proposed before for units that employ linear positioners, but I have recognized that it is possible to us it in such a way as substantially to eliminate the alignment problem peculiar to rotary positioners.

Specifically, I vary the track pitch with radial position so that the heads are always separated by an integral number of tracks regardless of positioner angle. This approach eliminates angular positioner motion as a source of misalignment. It also has the potential for reducing the alignment difficulties that can arise during fabrication; the side-by-side orientation permits the use of common masks to establish the position-determining features of both heads. One can thereby avoid mask misalignment as a source of error in relative head positioning.

BRIEF DESCRIPTION OF THE DRAWINGS

These and further features and advantages of the present invention are described below in connection with the accompanying drawings, in which.

DETAILED DESCRIPTION OF ILLUSTRATIVE EMBODIMENTS

Figure 1:
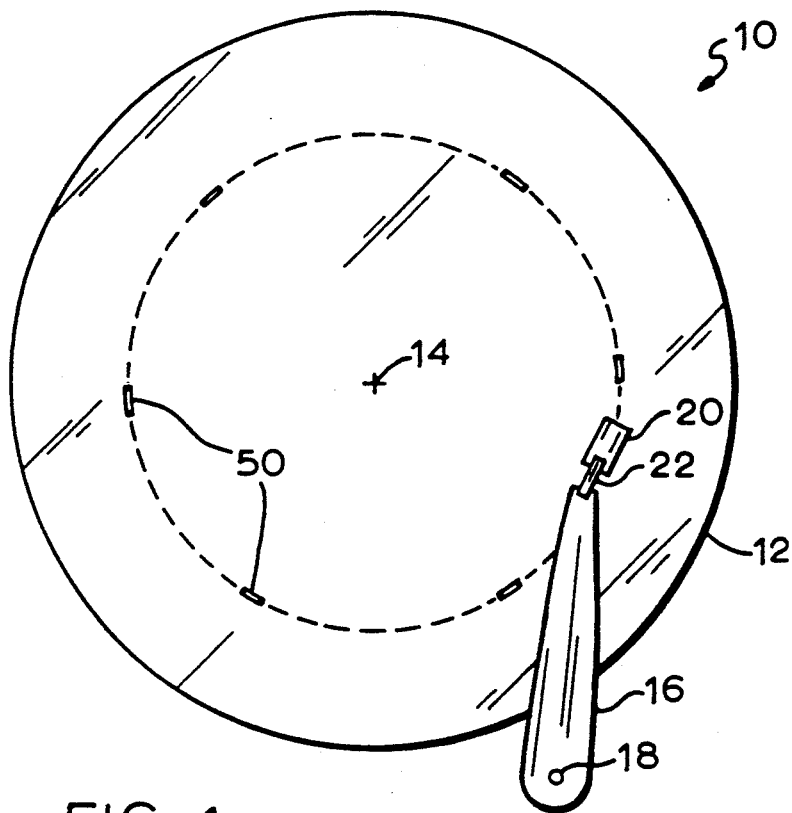
FIG. 1 is a diagrammatic representation of a disk drive of the type that can employ the teachings of the present invention.

The portion of a disk drive 10 shown in FIG. 1 includes a magnetic disk 12, which rotates about a disk axis 14 in the conventional manner. Under control of a positioning servo system not shown, a rotary positioner 16 pivots about a positioner axis 18 so as to position a slider 20 mounted to the positioner 16 by means of a flexure member 22.

Figure 2:
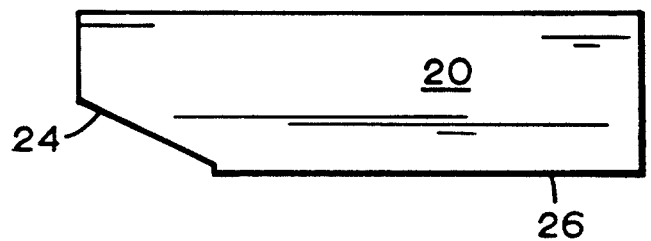
FIG. 2 is a side elevational view of the slider depicted in FIG. 1.
Figure 3:
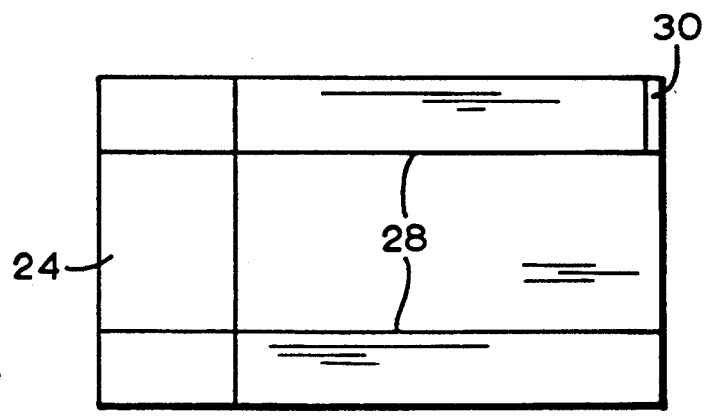
FIG. 3 is a bottom view of the same slider.

The slider 20, shown in more detail in FIGS. 2 and 3, includes a ramp surface 24 at its front end that assists in providing an air bearing between air-bearing surfaces 26 on rails 28 that extend longitudinally along the bottom surface of the slider 20. A head region 30 photolithographically formed on the rear surface of the slider provides read and write heads, as can be seen more clearly in FIG. 4.

Figure 4:
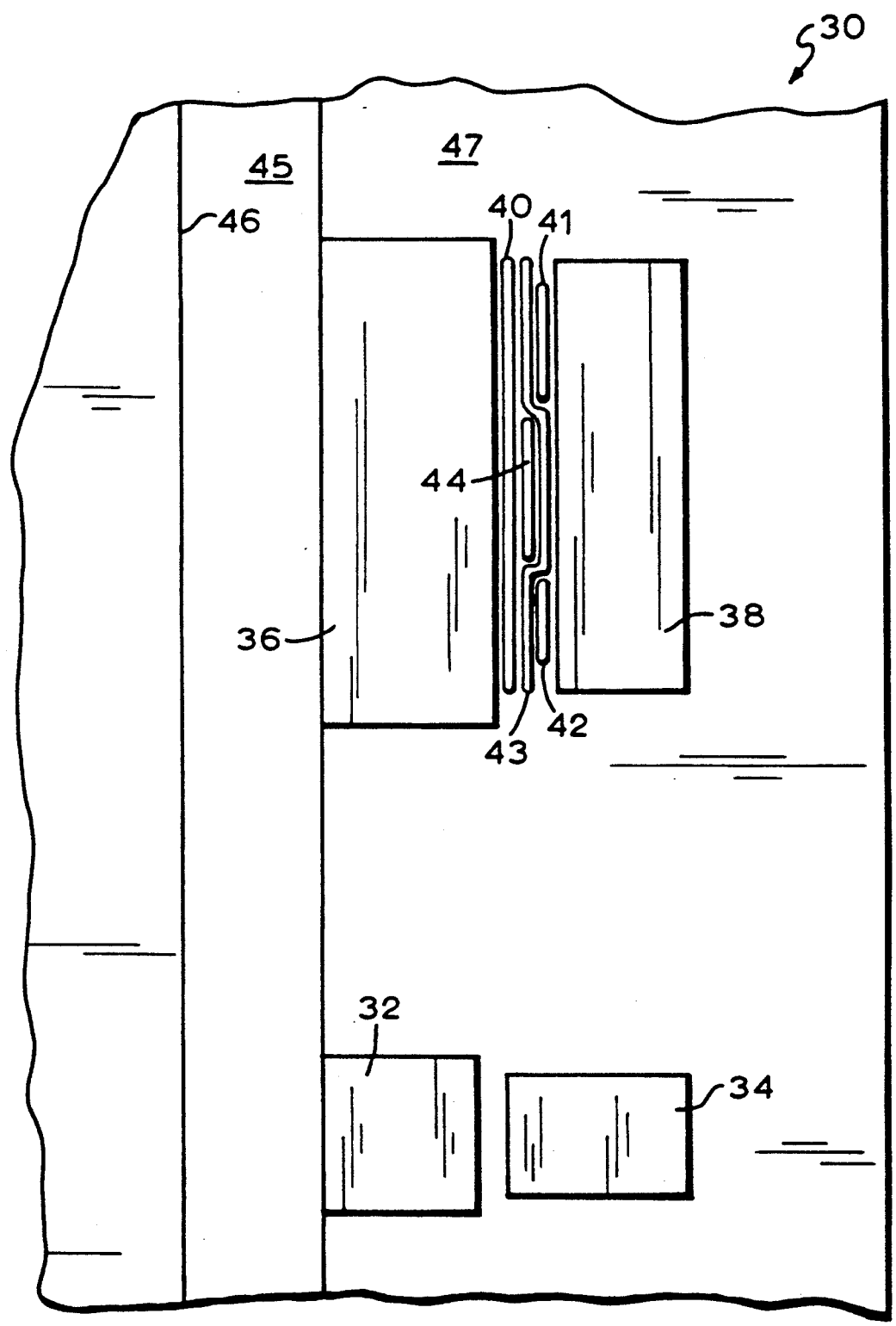
FIG. 4 is a more-detailed bottom view of the head portion of the slider of FIGS. 2 and 3.

FIG. 4 is a detailed view of the head region 30. This drawing, which again presents the view from the disk surface, shows the free ends of the pole pieces 32 and 34 of a write head of one type that can be used with the present invention. Also shown in FIG. 4 are the edges of shields 36 and 38 of a magnetoresistive read head, although read heads of other types can also be employed advantageously in the present invention.

In one type of magnetoresistive head, shields 36 and 38 are disposed in back and in front, respectively, of a NiFe magnetoresistive film 40 so as to minimize the film's receipt of magnetic fields from the disk-borne magnetic transitions until those transitions are located just below the film 40. Leads 41 and 42 are connected electrically to the magnetoresistive film 40 through anti-ferromagnetic MnFe deposited on a soft adjacent layer 43 of NiFeRh.

The leads provide the coupling of that film to the current-source and voltage-sense circuitry by which the drive uses the magnetoresistive film 40 to read the data on the disk. A tantulum spacer 44 between the magnetoresistive layer 40 and the soft adjacent layer 43 defines the active region of the head, which should be centered on the track centerline.

Although the specific types of heads and the manner in which they are fabricated do not constitute part of the present invention, it can be seen from FIG. 4 that the side-by-side arrangement can provide manufacturing economies. Typically, the head features depicted in FIG. 4 are constructed photolithographically. A ceramic base layer 45 is sputter-deposited on the erstwhile rear surface 46 of the slider body, the features described above are then formed on it, and a further encapsulation layer 47 is then sputter-deposited over the heads. The features positioned further forward on the slider are thus deeper in the lithographic structure, while the "upper" (later-deposited) features are farther to the rear. The side-by-side arrangement thus enables a common mask to establish the positions of corresponding features in the two heads. For instance, the write pole 32 and the read shield 36 might be positioned by a common mask, while pole 34 and shield 38 are positioned by another common mask. The intermediate layers of the read head would be positioned by intermediate masks. Such an approach would tend to minimize the number of processing steps needed to form the two heads.

Another approach is to arrange the fabrication steps so that a common mask establishes the most position-determinative features of the two heads. In the illustrated head structure, those features are likely to be the tantulum spacer 44 and the "upper" write head 34. By using this approach, the offset between the read and write positions can be set with a high degree of accuracy. Although this approach typically takes more than the minimum possible number of steps, it takes considerably fewer steps than a method in which one head is formed "on top of" the other in an attempt to align heads on a common track.

Before a disk is used to store data, it is formatted. That is, headers are written onto its surface to establish the positions of the tracks in which data ar to be written and read during actual use FIG. 1 depicts a plurality of headers 50 that are provided in a single one of the thousands of tracks that the formatting process provides. The formatting process comprises writing the header information at precisely determined positions on the disk surface and thereby establishing the track positions.

For floppy disks, formatting is performed in a largely routine writing process by normal disk-drive components. In the high-density hard disks to which the present application would more typically be applied, however, formatting requires a higher degree of accuracy, and the formatting occurs under low-vibration conditions during disk-drive manufacture. Typically, although not necessarily, the formatting occurs after the disks have been mounted in the drive, and the formatting information is written on the disks by the same heads that will be employed in normal use of the drive. But high-accuracy positioning equipment separate from the disk drive positions the heads during formatting.

As was previously mentioned, the header information includes at least sector-identifying information as well as a burst of timing signals that the disk drives use to synchronize its sampling clock. The teachings of the present invention are of particular benefit in those disk drives in which the header additionally includes sectored servo information. Sectored servo information differs from most information on a track in that it is contained in two magnetization patterns laid down side by side on the same track. That is, whereas most of the information in a track is encoded in the spacing of successive transitions between regions of like magnetization centered on the track centerline, the servo information comprises two such sequences of magnetization regions disposed on opposite sides of the track centerline. One component of the resultant read-head signal represents the right side of the track while the other represents the left side, and the head-positioning servo-system determines the position of the head with respect to the track centerline by comparing the magnitudes of those two components.

Although the drive obtains the servo information through the read head, it uses it in positioning both heads. In accordance with the present invention, this is possible in a system in which the servo information read on one track is used to position the write head over a different track—even if rotary positioners are used—because the track pitch is varied in accordance with the positioner angle, as will now be explained in connection with FIG. 5.

Figure 5A:
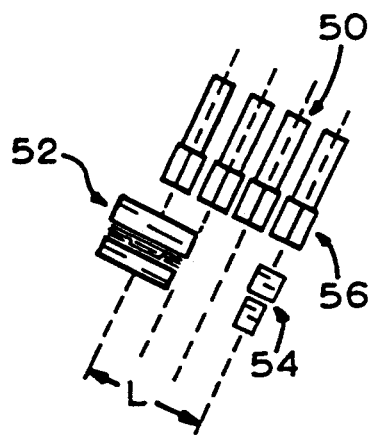
FIGS. 5A and 5B depict regions 51 and 51' of FIG. 5 in greater detail.
Figure 5B:
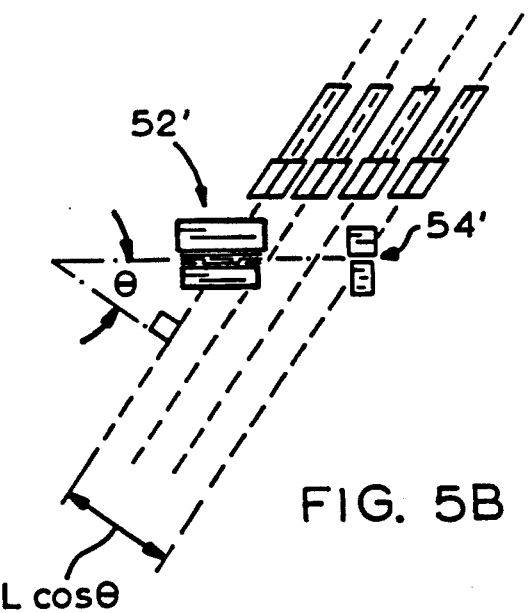
Figure 5:
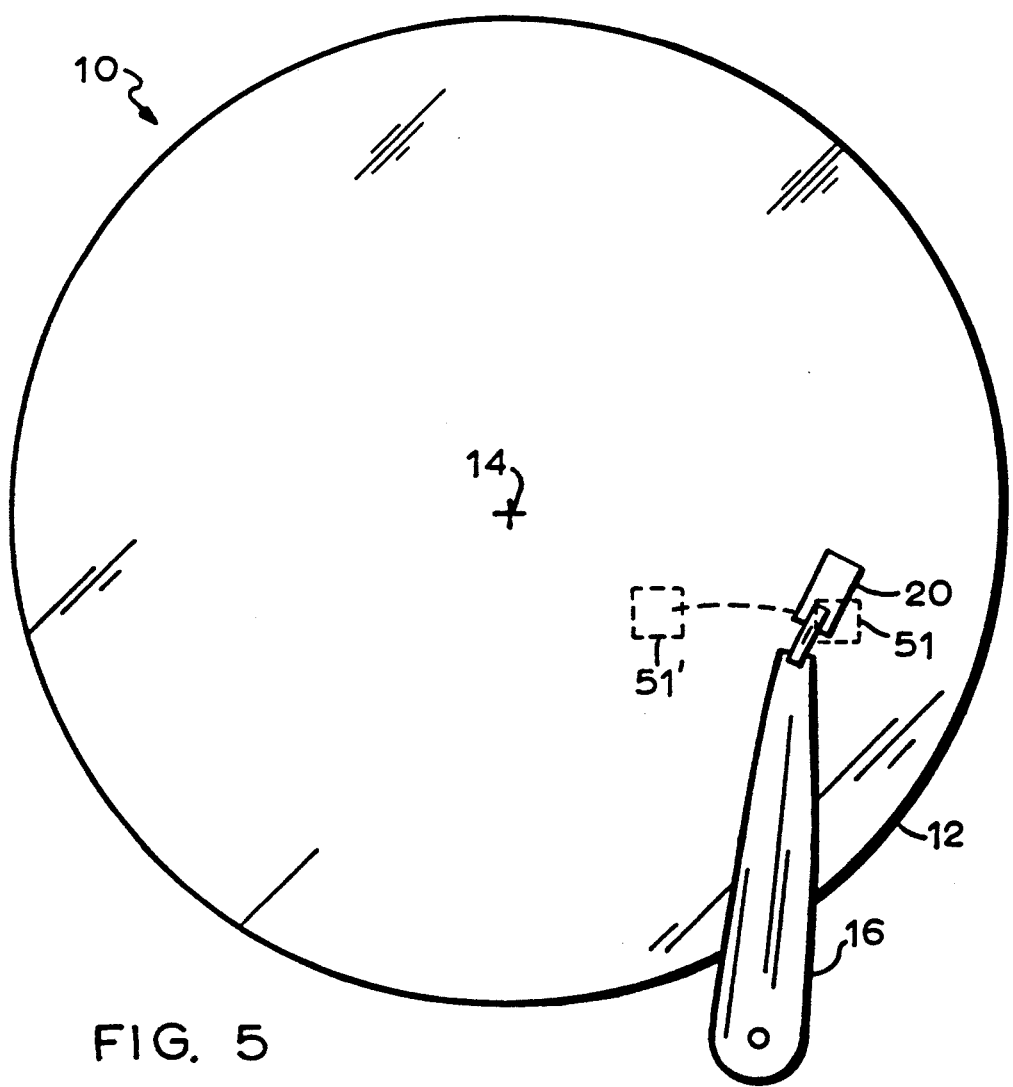
FIG. 5 is a diagrammatic view similar to FIG. 1.

FIG. 5 shows the disk 12 and positioner 16 as FIG. 1 does, while FIGS. 5A and 5B depict in detail regions on the disk surface represented in FIG. 5 by reference numerals 51 and 51', respectively. In particular, FIG. 5A depicts in detail the positions 52 and 54 of the read and write heads, respectively. Rotary positioners typically have an intermediate orientation in which the vector representing the displacement between the read and write head positions 52 and 54 (FIG. 5A) is purely radial i.e., in which that vector has essentially no circumferential component. FIG. 5A depicts the positioner 16 in this orientation, in which the radial separation between the two heads is greatest. According to the present invention, the pitch with which the headers 50 (here shown with drastically shortened servo bursts 56) are written on the disk 12 at this radial position results in substantially an integral number of track spacings between the heads. The number of track spacings between the heads in FIG. 5A is depicted as being four. Such a separation would ordinarily be the minimum for practical implementations of the present invention, although the invention could in principle be applied to a one-track separation.

If the distance between head positions is L, the track pitch is L/N, where N is the number of track spacings (four, in this case) between the heads. In the formatting process, therefore, headers are written at a pitch of L/N at that radial position.

In FIG. 5B, reference numerals 52' and 54' represent the positions that the heads will occupy when the positioner 16 has been displaced from the orientation depicted in FIG. 5, at which the heads are aligned on a disk radius, to one in which they are positioned over region 51' of FIG. 5. Although there is of course no change in the distance L between the heads, the change in angle causes a reduction in the radial component of the displacement vector between them. Specifically, the radial component is reduced from L to L cos $\theta$, where $\theta$ is the angle that the displacement vector forms with the radius through the head position. According to the present invention, therefore, headers are so written as to provide a track pitch substantially equal to (L/N) co $\theta$. Such a variation in track pitch enables the header information read on one track to be used to center the write head properly N tracks away.

The accuracy with which such pitch variation must be achieved depends on the head spacing and positioner angular range as well as other system parameters. Ordinarily, a head has to be centered rather accurately over a track centerline if error rates are to be acceptably low. At a minimum, the pitch variation of the present invention is necessary in drives in which the pitch is less than the variation in the radial component of the head-displacement vector, but it is applicable at lower track densities, too. In high-performance drives, deviation by more than ten percent of the track pitch would not ordinarily be acceptable. In any drive in which the range of positioner angles is great enough that the variation in radial head spacing exceeds ten percent of the pitch, some pitch variation will be necessary if the radial component of the head spacing is to differ from an integral number of pitch spacings by less then ten percent of the pitch. Since it is within current manufacturing capabilities to position the headers well enough that the difference is kept below five percent for most practical track pitches, however, I prefer to keep the variation within that range, and, when possible, within two percent.

If complementary errors are permitted in the read and write heads, on the other hand, one might in principle accept a radial-head-spacing variation as great as twenty percent and still meet the ten-percent-of-pitch centering requirement. But the constraints that allowing such variations would impose on other system features would ordinarily militate against permitting them.

Finally, although the foregoing discussion is based on the tacit assumption that track/sector-information reading and the related data writing are to be performed at the same positioner angle, one might also apply the teachings of the present invention to drives in which the positioner angle is to change between these operations under control of sectored servo signals. For application of the present invention to such systems, as much as forty percent variation might be accepted before pitch variation is needed, because servo signals are typically usable through a greater width than others are. Still, the tighter variation requirements mentioned above would be preferable even in such systems.

Only a few changes to conventional drive operation need to be made in order to obtain the benefits of the present invention. One, of course, is that the header information that the positioning system must seek will identify track M+N or M−N, rather than track M, when the drive is to write on track M.

Another change is necessary if the disk drive employs bad-block-replacement information contained in the header. Such information indicates that data intended for a given block within the sector is now located at a new specified location, typically because the given block is error-prone. The bad-block-replacement information is used for both read and write operations, so headers in such a disk drive need to have bad-block-replacement information both for the associated sector on the header's track and for the corresponding sector N tracks away.

With only minor adjustments in operating procedure, therefore, the present invention enables the advantages of rotary positioners to be retained even at high data densities. The present invention thus constitutes a significant advance in the art.

I claim:

1. In a disk drive for data storage comprising at least one magnetic disk having a disk surface on which data can be written and read, means for spinning the at least one disk about a disk axis, a rotary positioner arm pivotable through a range of position angles about a positioner axis spaced from the disk axis, and read and write heads mounted on the rotary positioner in proximity to the disk surface for reading and writing data thereon, the improvement wherein:
   A) the read and write heads on a given positioner are separate and spaced apart by a head displacement vector whose radial component with respect to the disk axis varies with the position angle; and
   B) the disk is formatted with headers that define tracks having a track pitch that is less than the radial component of the head displacement vector and varies with radial position in such a manner that the number of tracks between the read and write heads when a head is centered on a track is independent of position angle.

2. A disk drive as defined in claim 1 wherein the headers contain sectored servo information.

3. A disk drive as defined in claim 1 wherein the disk is so formatted as to establish a pitch that is less than two and a half times the variation in the radial component of the head separation and that so varies with radial position that the radial component of the head separation differs by less than forty percent of the pitch from an integral multiple of the pitch at all position angles.

4. A disk drive as defined in claim 3 wherein the pitch so varies with radial position that the radial component of the head separation differs by less than twenty percent of the pitch from an integral multiple of the pitch at all position angles.

5. A disk drive as defined in claim 4 wherein the headers contain sectored servo information.

6. A disk drive as defined in claim 3 wherein the headers contain sectored servo information.

7. A disk drive as defined in claim 1 wherein the disk is so formatted as to establish a pitch that is less than five times the variation in the radial component of the head separation and that so varies with radial position that the radial component of the head separation differs by less than twenty percent of the pitch from an integral multiple of the pitch at all position angles.

8. A disk drive as defined in claim 7 wherein the pitch so varies with radial position that the radial component of the head separation differs by less than ten percent of the pitch from an integral multiple of the pitch at all position angles.

9. A disk drive as defined in claim 8 wherein the headers contain sectored servo information.

10. A disk drive as defined in claim 1 wherein the disk is so formatted as to establish a pitch that is less than ten times the variation in the radial component of the head separation and that so varies with radial position that the radial component of the head separation differs by less than ten percent of the pitch from an integral multiple of the pitch at all position angles.

11. A disk drive as defined in claim 10 wherein the pitch so varies with radial position that the radial component of the head separation differs by less than five percent of the pitch from an integral multiple of the pitch at all position angles.

12. A disk drive as defined in claim 11 wherein the pitch so varies with radial position that the radial component of the head separation differs by less than two percent of the pitch from an integral multiple of the pitch at all position angles.

13. A disk drive as defined in claim 11 wherein the headers contain sectored servo information.

14. A disk drive as defined in claim 1 wherein the disk is so formatted as to establish a pitch that is less than the variation in the radial component of the head displacement vector.

15. A disk drive as defined in claim 1 wherein the disk is so formatted as to establish at radial position a pitch substantially equal to $(L/N) \cos \theta$, where L is the magnitude of the head displacement vector, N is an integer, and $\theta$ for a given radial position is the angle that the head displacement vector forms with a disk radius through the head position when the heads are disposed at the given radial position.

16. A disk drive as defined in claim 15 wherein the headers contain sectored servo information.

17. In a disk drive for data storage comprising at least one magnetic disk having a disk surface on which data can be written and read, means for spinning the at least one disk about a disk axis, a rotary positioner arm pivotable through a range of position angles about a positioner axis spaced from the disk axis, and read and write heads mounted on the rotary positioner in proximity to the disk surface for reading and writing data thereon, the improvement wherein:
   A) the read and write heads on a given positioner are separate and spaced apart by a head displacement vector whose radial component with respect to the disk axis varies with the position angle; and
   B) the disk is formatted with headers containing sectored servo information that define tracks having a track pitch that is less than the variation in the radial component of the head displacement vector and varies with radial position in such a manner that the number of tracks between the read and write heads when a head is centered on a track is independent of position angle.

* * * * *